(12) United States Patent
Yasuda et al.

(10) Patent No.: US 8,615,666 B2
(45) Date of Patent: Dec. 24, 2013

(54) PREVENTING UNAUTHORIZED ACCESS TO INFORMATION ON AN INFORMATION PROCESSING APPARATUS

(75) Inventors: Tomoari Yasuda, Ichikawa (JP); Koji Saruwatari, Yokohama (JP); Kiyotaka Nakayama, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 893 days.

(21) Appl. No.: 12/327,328

(22) Filed: Dec. 3, 2008

(65) Prior Publication Data

US 2009/0158052 A1 Jun. 18, 2009

(30) Foreign Application Priority Data

Dec. 3, 2007 (JP) ................................. 2007-312358

(51) Int. Cl.
 *G06F 12/14* (2006.01)
(52) U.S. Cl.
 USPC ............... 713/189; 713/2; 713/171; 713/193; 726/24; 709/212; 709/229
(58) Field of Classification Search
 USPC ......................................................... 713/189
 See application file for complete search history.

(56) References Cited

U.S. PATENT DOCUMENTS

| | | | | |
|---|---|---|---|---|
| 2002/0184436 | A1* | 12/2002 | Kim et al. ...................... | 711/103 |
| 2004/0267984 | A1* | 12/2004 | Fukushima et al. ............ | 710/60 |
| 2005/0102377 | A1* | 5/2005 | King et al. ..................... | 709/219 |
| 2006/0080385 | A1* | 4/2006 | Blandford et al. ............. | 709/203 |
| 2006/0080521 | A1* | 4/2006 | Barr et al. ........................ | 713/2 |
| 2006/0268803 | A1* | 11/2006 | Lee et al. ........................ | 370/338 |
| 2007/0011374 | A1* | 1/2007 | Kumar et al. .................. | 710/105 |
| 2007/0011672 | A1* | 1/2007 | Bhide et al. .................... | 717/174 |
| 2007/0198656 | A1* | 8/2007 | Mazzaferri et al. ........... | 709/218 |
| 2007/0266261 | A1* | 11/2007 | Nishiguchi et al. ........... | 713/193 |
| 2007/0294534 | A1* | 12/2007 | Asai et al. ...................... | 713/171 |
| 2007/0300293 | A1* | 12/2007 | Tsutsui et al. .................... | 726/5 |

(Continued)

FOREIGN PATENT DOCUMENTS

| | | |
|---|---|---|
| JP | 2003132229 A | 5/2003 |
| JP | 2006039794 A | 2/2006 |

(Continued)

*Primary Examiner* — Linglan Edwards
*Assistant Examiner* — Gary Gracia
(74) *Attorney, Agent, or Firm* — Yudell Isidore Ng Russell PLLC

(57) ABSTRACT

Information is prevented from being retrieved by an unauthorized person when an information processing apparatus is stolen or lost. There is provided an information processing apparatus including: a storage; dividing logic/utility that divides data stored on the storage into a predetermined first number of pieces of partial data; transmitting logic/utility that transmits one or more of the first number of pieces of divided partial data to one or more different information processing apparatuses, and deletes the one or more of the first number of pieces of partial data from the storage; retrieving logic/utility that retrieves the one or more pieces of partial data from the one or more different information processing apparatuses, and stores the retrieved pieces of partial data onto the storage; and restoring logic/utility that restores the data from the minimum number of pieces of partial data.

18 Claims, 12 Drawing Sheets

(56) References Cited

U.S. PATENT DOCUMENTS

| | | | |
|---|---|---|---|
| 2008/0115015 A1* | 5/2008 | Ikezawa et al. | 714/42 |
| 2008/0127348 A1* | 5/2008 | Largman et al. | 726/24 |
| 2008/0168135 A1* | 7/2008 | Redlich et al. | 709/204 |
| 2008/0172555 A1* | 7/2008 | Keenan | 713/2 |
| 2008/0183837 A1* | 7/2008 | Lee et al. | 709/212 |
| 2008/0222734 A1* | 9/2008 | Redlich et al. | 726/26 |
| 2008/0263217 A1* | 10/2008 | Kimizuka et al. | 709/229 |
| 2009/0060198 A1* | 3/2009 | Little | 380/278 |

FOREIGN PATENT DOCUMENTS

| | | |
|---|---|---|
| JP | 2006311383 A | 11/2006 |
| JP | 2007058771 A | 3/2007 |
| JP | 2007122446 A | 5/2007 |
| JP | 2007300157 A | 11/2007 |
| WO | 2007061119 A1 | 5/2007 |

* cited by examiner

100

| DESTINATION MANAGEMENT INFORMATION ||
|---|---|
| SOURCE USER IDENTIFYING INFORMATION (LOGIN NAME) | DESTINATION USER IDENTIFYING INFORMATION (LOGIN NAME) |
| AAA | CCC<br><br>BBB<br><br>ADMIN |

| LOGIN MANAGEMENT INFORMATION ||
|---|---|
| USER IDENTIFYING INFORMATION (LOGIN NAME) | MACHINE IDENTIFYING INFORMATION (IP ADDRESS) |
| CCC | 192.168.0.X |
| BBB | 192.168.0.Y |
| ADMIN | 192.168.0.Z |

*FIG. 10*

PREVENTING UNAUTHORIZED ACCESS TO INFORMATION ON AN INFORMATION PROCESSING APPARATUS

PRIORITY CLAIM

The present application claims benefit of priority under 35 U.S.C. §§120, 365 to the previously filed Japanese Patent Application No. JP2007-312358 entitled, "Image Processing Apparatus for Checking Unauthorized Access to Information and Method of Performing the Same" with a priority date of Dec. 3, 2007. The content of the previously filed application is incorporated by reference herein in its entirety.

BACKGROUND

1. Field of the Invention

The present invention relates to an image processing apparatus for checking unauthorized access to information and a method of performing the same. More particularly, the present invention relates to an apparatus for preventing unauthorized retrieval of information that is stored on storage of an information processing apparatus.

2. Background of the Invention

Thin clients are adopted for information systems of corporations in order to prevent inadvertent information leakage. The thin clients do not have non-volatile storages such as hard disk drives. Therefore, a variety of business-related data is stored not on the thin clients but on a server. The data is highly secured and the data is protected even when the thin clients are stolen.

Thin clients are implemented by an image transmission method or a screen transmission method. According to the image transmission method, the server transmits operating systems and other data to the individual thin clients when thin clients are booting. Under the condition that the thin clients are powered off, the transmitted data is deleted. According to the screen transmission method, the server transmits to the thin clients the output of the programs executed on the server, for example, screen images, and the thin clients transmit to the server the input from the users into the thin clients.

The image transmission method significantly increases the network traffic by the transmission of the operating systems and other data. The information systems of corporations heavily load the network particularly around the business-start time of a day. This results in a long booting time for the respective thin clients.

To solve these issues, the non-volatile storages in the thin clients may store thereon the basic parts of the operating systems, and the server may store thereon the updates of the operating systems and user data and transmit the updates of the operating systems and user data to the thin clients. Here, the C and D drives of a thin client or personal computer can be respectively configured non-volatile and volatile. In this method, however, the storages in the thin clients (for example, the C drive) may store user data, and the security may thus be impaired.

The screen transmission method has a different drawback. Since the server executes programs for the many thin clients, the server load is enormous. Therefore, the corporations have to make a large investment in equipment. This is because the processing load for the application programs must be borne by a single or small number of servers. Such a server needs to execute multi-user programs. This need of the server(s) limits the degree of freedom.

As described above, the information systems based on the thin client architecture have tradeoffs between the security and the reduction of communication/processing load. Therefore, it is an object of an aspect of the innovations herein to provide an information processing apparatus, a method and a program product which are capable of overcoming the above drawbacks. The above and other objects can be achieved by combinations described in the independent and other claims. The dependent claims define further advantageous and exemplary combinations of the innovations herein.

SUMMARY OF THE INVENTION

To solve the above-mentioned issues, a first embodiment of the present invention provides an information processing apparatus capable of communicating with one or more different information processing apparatuses. The information processing apparatus includes: a storage; a dividing section/logic/utility that divides data stored on the storage into a predetermined first number of pieces of partial data in accordance with a secret sharing scheme, where the secret sharing scheme requires a predetermined minimum number of pieces of partial data to restore the data, and where the first number is larger than or equal to the minimum number; a transmitting section/logic/utility that (a) transmits one or more of the first number of pieces of divided partial data to one or more different information processing apparatuses, and (b) deletes the one or more of the first number of pieces of partial data from the storage; a data retrieval section/logic/utility that, in order that the data is restored on the storage, retrieves the one or more pieces of partial data from the one or more different information processing apparatuses, and stores the retrieved pieces of partial data onto the storage; and a restoring section/logic/utility that restores the data from the minimum number of pieces of partial data, under the condition that the number of pieces of partial data retrieved and stored on the storage by the data retrieval section reaches the minimum number. In addition, there are provided a method and a program to process data by using the above-described information processing apparatus.

The summary clause does not necessarily describe all necessary features of the embodiments of the present invention. The present invention may also be a sub-combination of the features described above. The above and other features and advantages of the present invention will become more apparent from the following description of the embodiments taken in conjunction with the accompanying drawings.

BRIEF DESCRIPTION OF THE DRAWINGS

FIG. 10 illustrates, as an example, a variety of information stored on a server 100 according to the present embodiment.

DETAILED DESCRIPTION OF AN ILLUSTRATIVE EMBODIMENT

Some aspects of the invention will now be described based on an embodiment, which does not intend to limit the scope of the present invention, but exemplifies the invention. All of the features and the combinations thereof described in the embodiment are not necessarily essential to the invention.

Figure 1:
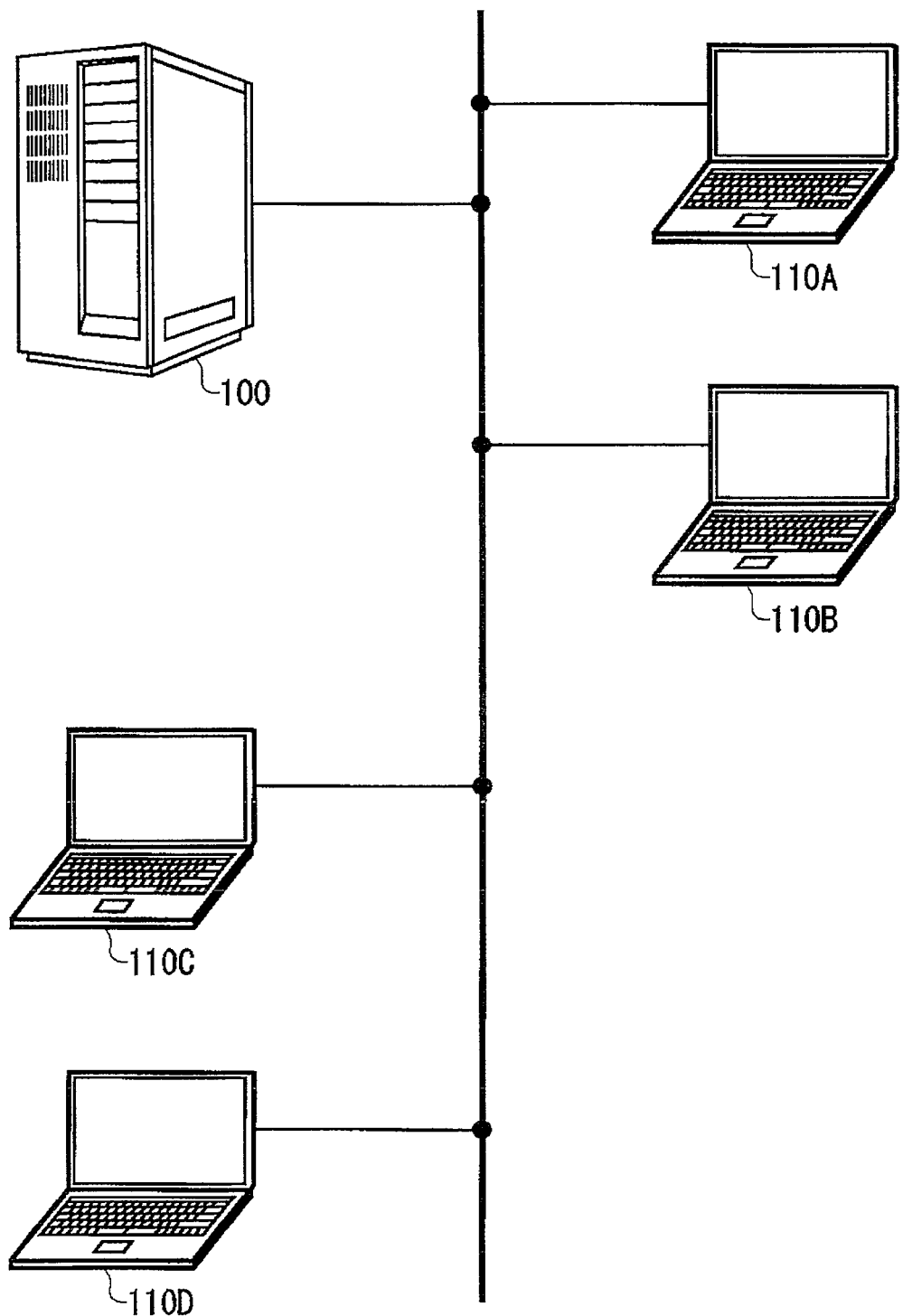
FIG. 1 illustrates an exemplary overall configuration of an information system 10 according to an embodiment of the present invention.

FIG. 1 illustrates an exemplary overall configuration of an information system 10 according to an embodiment of the present invention. The information system 10 includes a server 100 and a plurality of clients (for example, clients 110A to 110D) which are connected so as to be capable of communicating with each other via a communication network. The server 100 is shown as an example of an information processing apparatus, and may be a desktop computer referred to as a host computer, for example. The server 100 usually stores important data including confidential business information. Therefore, the server 100 is located in a highly secure dedicated room, which is separately prepared from normal office areas.

The client 110A is shown as an example of the information processing apparatus, and may be a portable computer such as notebook and laptop computers. Alternatively, the client 110A may be a personal digital assistant (PDA), a mobile telephone or the like. The clients 110B to 110D are the same as the client 110A, except that the clients 110B to 110D are managed by different users from the client 110A.

The client 110A is located in the office area permitted for general employees or at the home of an employee who works from home. For this reason, the client 110A preferably does not keep important data such as confidential business information. The information system 10 according to the present embodiment aims to prevent the leakage of the confidential information from happening even when the client 110A with relatively low security is stolen or lost. While realizing this aim, the present embodiment can also reduce the band necessary for the communication network and the processing capacity necessary for the server 100 when compared with a case where the confidential information is entirely kept on the server 100. The following describes the present embodiment in detail.

Figure 2:
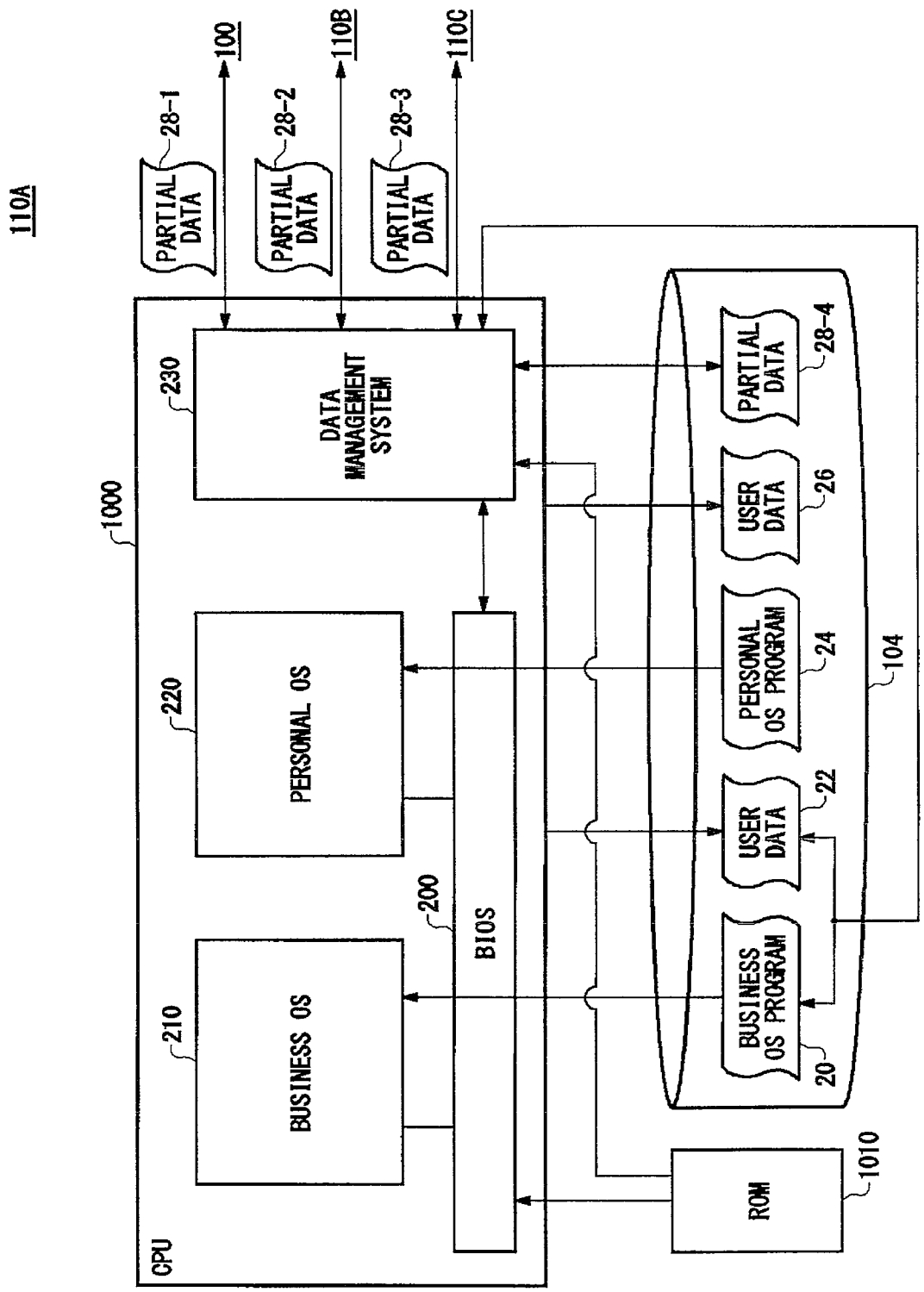
FIG. 2 illustrates an exemplary functional configuration of a client 110A according to the present embodiment.

FIG. 2 illustrates an exemplary functional configuration of the client 110A according to the present embodiment. The client 110A has the same hardware configuration as a so-called personal computer (PC). The client 110A includes a CPU 1000, a ROM 1010 and a storage 104 as main hardware components. The ROM 1010 is a non-volatile read-only storage, and stores programs which operate independently from an operating system (hereinafter referred to as an OS), for example, BIOS programs.

The storage 104 is not only readable but also writable, and may be a hard disk drive, for example. The storage 104 stores a variety of data used by a user for performing duties, such as OS programs and user data. In this example, the storage 104 stores a business OS program 20 and user data 22 for business use, and a personal OS program 24 and user data 26 for personal use. The business OS program 20 and the personal OS program 24 each have not only the basic parts of an operating system (i.e. kernel) but also diverse application programs associated with the operating system.

For example, a case is assumed where the OS used by the client 110A is the Windows® Operating System. The storage 104 may store the business OS program 20 in the "C:\Windows" folder and the user data 22 in the "C:\MyDocuments" folder. On the other hand, the storage 104 may store the personal OS program 24 in the "D:\Windows" folder and the user data 26 in the "D:\MyDocuments" folder.

The CPU 1000 executes the programs stored on the ROM 1010 and/or the storage 104, to function as a variety of systems. To be specific, the CPU 1000 reads the BIOS program from the ROM 1010 and executes the read program, for example, at the startup of the client 110A, to function as a BIOS 200. By means of the function of a personal OS 220, the CPU 1000 reads the business OS program 20 from the storage 104 and executes the read business OS program 20. In this way, the CPU 1000 functions as a business OS 210.

The user performs a variety of duties by means of the application programs operating on the business OS 210 or the business OS 210 itself. As a result of this, the storage 104 stores the user data 22 including, for example, confidential business information. The CPU 1000 may read the personal OS program 24 from the storage 104 and execute the read personal OS program 24, by means of a so-called multiboot function of the BIOS 200. In this manner, the CPU 1000 enables functioning of the personal OS 220. The user performs duties by using the application programs and the like operating on the personal OS 220. As a result of this, the storage 104 stores the user data 26.

When finishing the duties, the user often shuts down the client 110A. The shutdown indicates, for example, that the client 110A is turned off or goes into the standby or hibernation status. If the user shuts down the client 110A with confidential information being stored on the storage 104, the confidential information may leak in the case of theft or loss of the client 110A. In order to prevent such information leakage, the CPU 1000 functions a data management system 230 for managing the data stored on the storage 104. The data management system 230 may be realized, for example, by a program stored on the ROM 1010.

In detail, the data management system 230 reads the business OS program 20 and the user data 22 from the storage 104 on reception of an instruction to shut down the client 110A. The data management system 230 archives the business OS program 20 and user data 22, to generate archive data. The data management system 230 divides the generated archive data into a predetermined first number of pieces of partial data in accordance with a secret sharing scheme. In the secret sharing scheme, it is necessary to retrieve a predetermined minimum number of pieces of partial data to restore the archive data, and the first number is larger than or equal to the minimum number. In the present embodiment, the minimum number is three, and the first number is four. The pieces of partial data generated in this manner are labeled as partial data 28-1 to 28-4.

The data management system 230 selects at least some of the pieces of partial data 28-1 to 28-4, (e.g. the partial data 28-1 to 28-3). The data management system 230 transmits the selected pieces of partial data 28-1 to 28-3 to at least one of other information processing apparatus, and deletes the selected pieces of partial data 28-1 to 28-3 from the storage 104. Consequently, for example, the partial data 28-1 is transmitted to the server 100 and stored on a storage in the sever apparatus 100, the partial data 28-2 is transmitted to the client 110B and stored on a storage in the client 110B, and the partial data 28-3 is transmitted to the client 110C and stored on a storage in the client 110C. On the other hand, the partial data 28-4 will remain on the storage 104. After this, the data management system 230 continues conducting the shutdown as instructed, to switch off the client 110A or goes into the standby.

Although at least three of the pieces of partial data are necessary to restore the original archive data, the storage 104 stores only one of the pieces of partial data. In this case, even though a malicious user steals the client 110A and analyzes the data stored on the storage 104, he can not restore the confidential business data. In the secret sharing scheme, the original archive data cannot be restored if at least three of the pieces of partial data of the original archive data are not present. If less than three pieces are present, the partial data cannot even provide a clue in the analysis for restoring the original data.

In receiving an instruction to resume the operation of the client 110A (for example, a startup instruction or a standby mode exit instruction), the data management system 230 requests other information processing apparatuses (in the present example, the server 100 and the clients 110B and 110C) to return the partial data. The data management system 230 restores the business OS program 20 and the user data 22 on the storage 104, based on the returned pieces of partial data 28-1 to 28-3 and the partial data 28-4 having already been stored on the client 110A. The data management system 230 continues performing the operation to resume the operation of the client 110A, to resume operation of the business OS 210.

Figure 3:
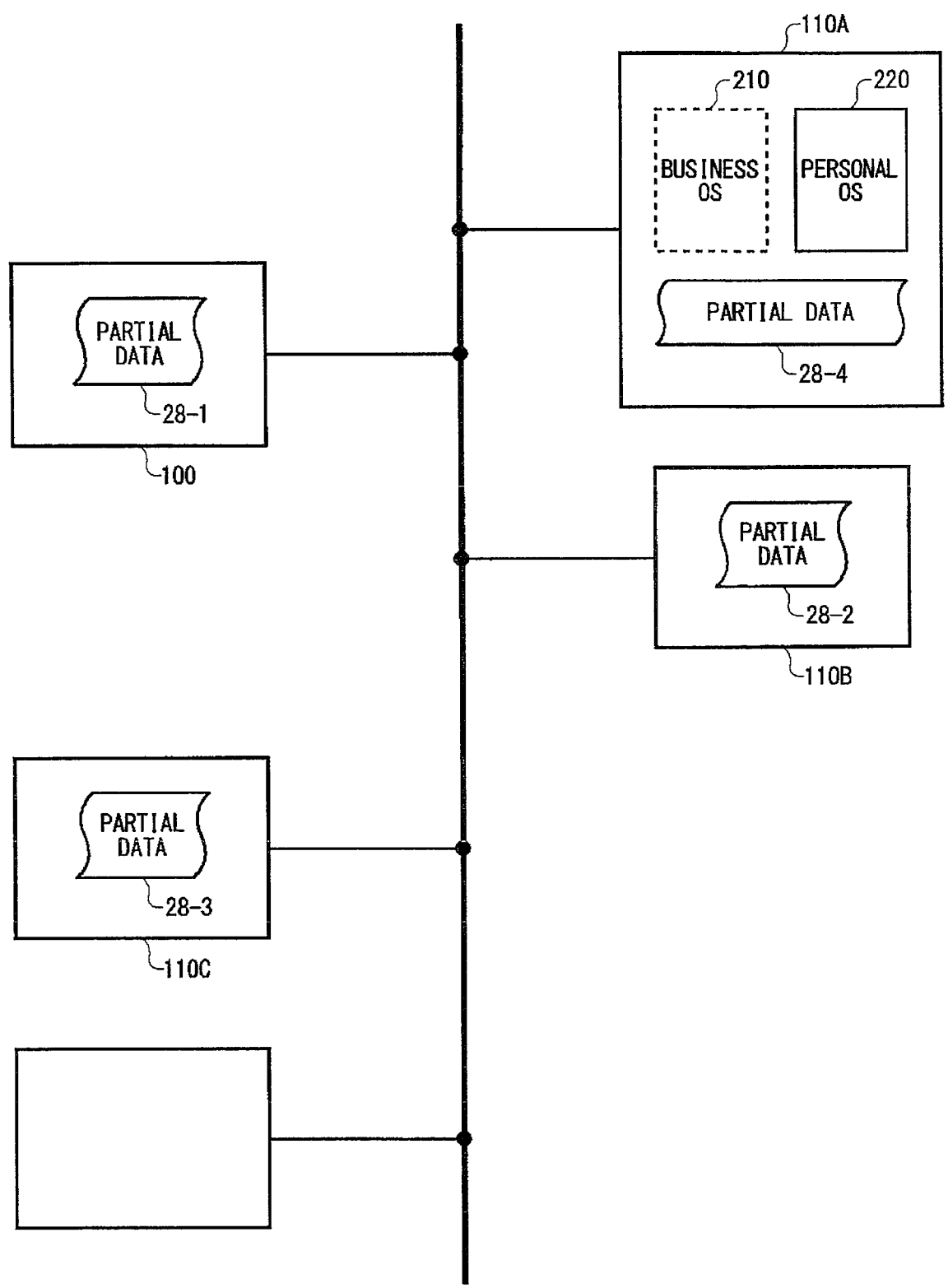
FIG. 3 illustrates the state of the information system 10 after transmission of the respective pieces of partial data.

FIG. 3 illustrates the state of the information system 10 after transmission of the respective pieces of partial data. After the transmission of the partial data 28-1 to 28-3 from the client 110A, the server 100 stores the partial data 28-1, the client 110B stores the partial data 28-2, the client 110C stores the partial data 28-3, and the client 110A stores the partial data 28-4.

In this state, the business OS 210 can not operate on the client 110A while the personal OS 220 can operate on the client 110A. This means that an authorized user can use the client 110A outside the business occasions for a different purpose and that the confidential business information does not leak.

Figure 4:
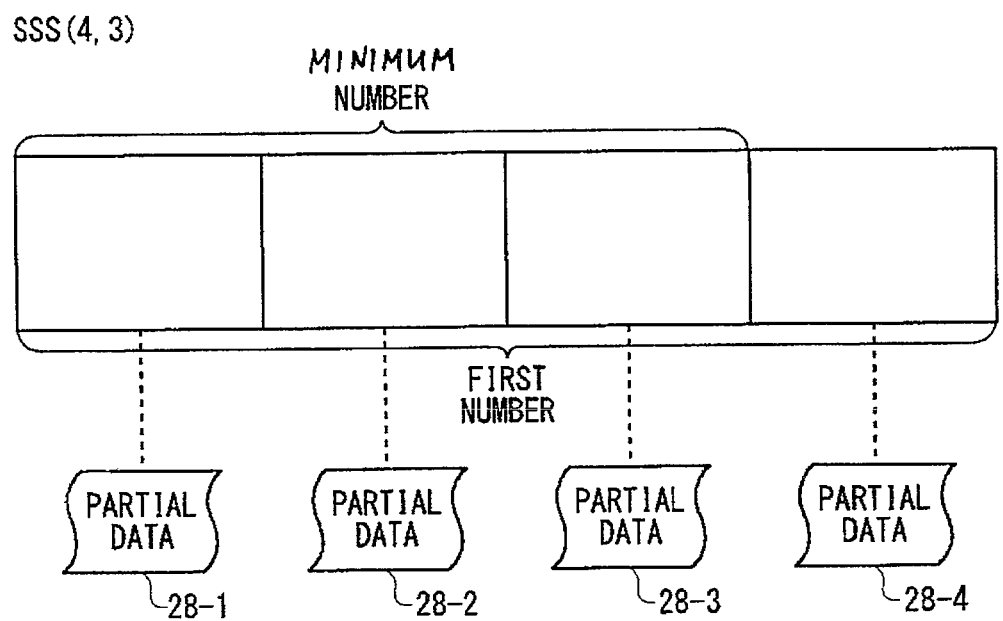
FIG. 4 is a conceptual view illustrating a process of dividing archive data into pieces of partial data.

FIG. 4 is a conceptual view illustrating the process of dividing the archive data into the pieces of partial data. The threshold secret sharing scheme has, as the parameters, the first number denoting the number of the pieces of divided partial data and the minimum number denoting the number of pieces of partial data required to restore the original data. FIG. 4 illustrates the threshold secret sharing scheme where the first number is set at four and the minimum number is set at three.

The threshold secret sharing scheme with the parameters is represented as SSS(4, 3) by using the acronym of the secret sharing schemes. The four pieces of partial data generated in this threshold secret sharing scheme are labeled as the partial data 28-1 to 28-4. Unless at least any three of the four pieces of partial data are present, the original data can not be restored.

Analysis of the threshold secret sharing scheme has mathematically proved that unless the number of collected pieces of partial data reaches the minimum number, even a single bit of the original data cannot be restored even by analysis for an infinite time using a highly-advanced computer. Having such characteristics, the threshold secret sharing scheme can protect secrecy far more securely than encryption schemes vulnerable to decryption due to highly advanced future computers or discovery of decryption algorithms.

In view of the above, the number of partial data transmitted from the data management system 230 to the other information processing apparatuses is set (for example, at three) larger than the difference between the first number and the minimum number (in the present example, one) so that the client 110A alone can not restore the original data. In order to make it as difficult to restore the original data as possible, the data management system 230 may preferably transmit pieces of partial data respectively to other information processing apparatuses. As discussed above, use of the secret sharing schemes can make it extremely difficult for malicious users to restore the archive data, as is shown in FIG. 5 in more detail.

Figure 5:
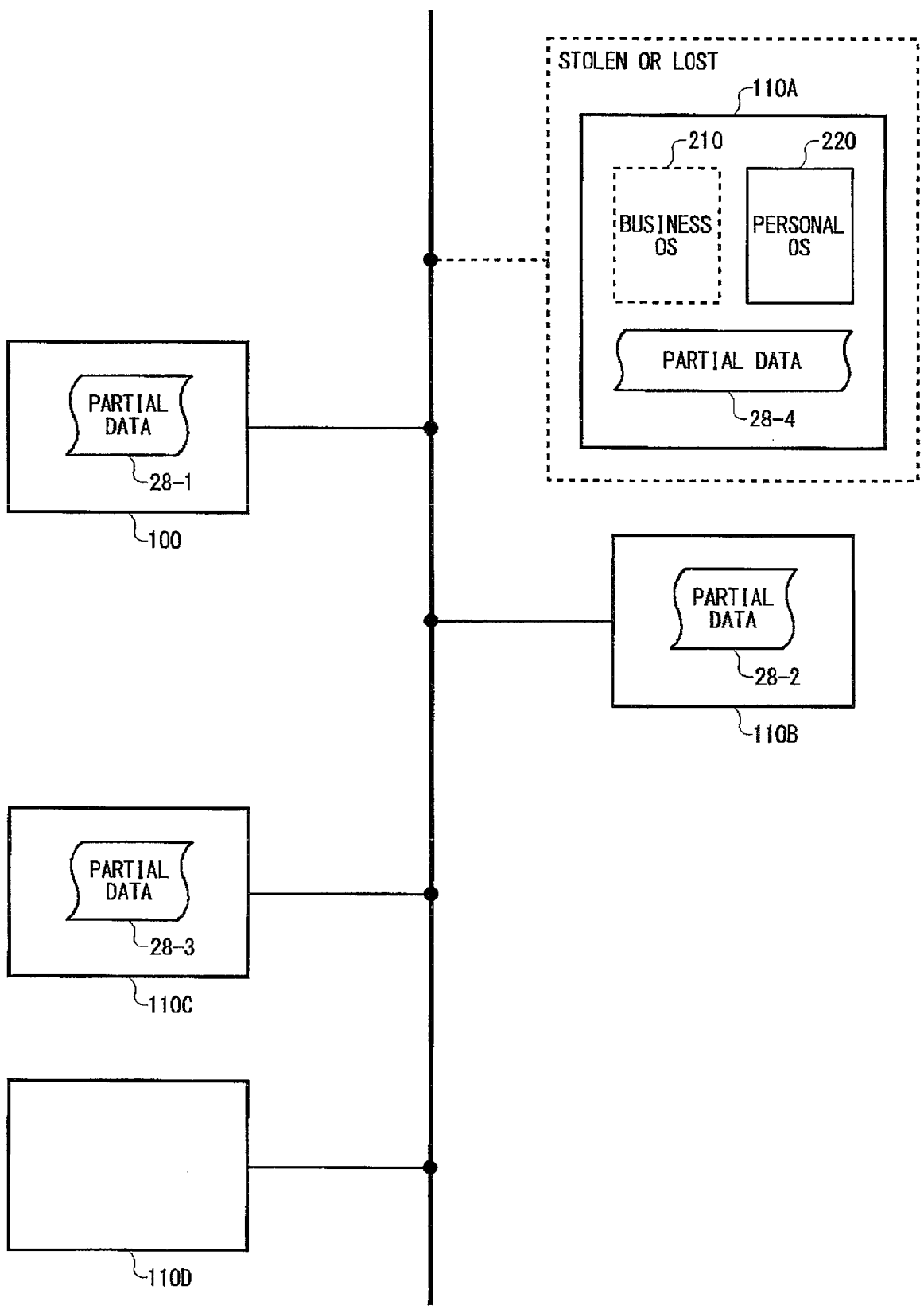
FIG. 5 illustrates the information system 10 from which the client 110A is stolen or lost.

FIG. 5 illustrates the information system 10 from which the client 110A is stolen or lost. When the client 110A is stolen or lost, an unauthorized user may retrieve the partial data 28-4 stored on the client 110A. As is explained previously, however, the partial data 28-4 alone is not enough to restore the original data.

The unauthorized user may attempt to illegally retrieve the partial data 28-1 to 28-3 by stealing the server 100 and the clients 110B and 110C. However, the server 100 is very difficult to be stolen since it is attended with special care. The clients 110B and 110C may also be geographically distant from the client 110A depending on the configuration of the communication network, which makes it very difficult to steal all of the clients 110A to 110C.

Furthermore, unlike the measures against theft of the client 110A, today's measures against the unauthorized accesses to the communication network are sufficient in many cases. Therefore, it is also extremely difficult to make unauthorized accesses to the communication network or retrieve partial data 28-1 to 28-4 from the server 100 and the clients 110B and 110C. Moreover, the attempt to retrieve the partial data illegally is considered as extremely difficult, for it is only possible while the server 100 and the clients 110B and 110C are in operation (e.g. during the business hours).

As described above, the information system 10 according to the present embodiment can make illegal retrieval of information extremely difficult in the case of theft of the client 110A. At the same time, the information system 10 according to the present embodiment hardly impairs the convenience for the user as discussed below with reference to FIG. 6.

Figure 6:
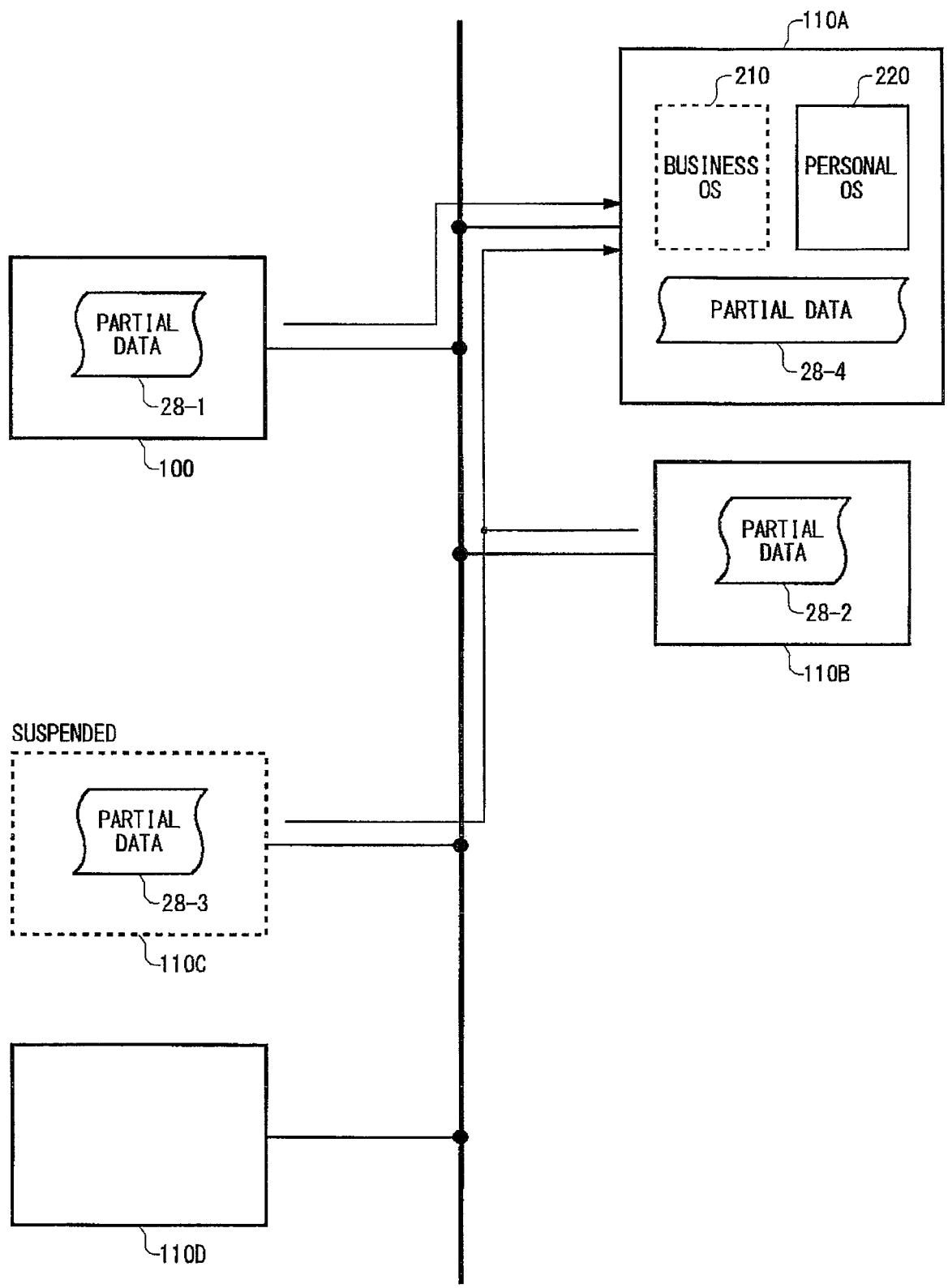
FIG. 6 illustrates the information system 10 where the client 110C is suspended.

FIG. 6 illustrates the information system 10 where the client 110C is suspended. When the user attempts to start up the client 110A to start working, the client 110A requests the server 100 and the clients 110B to 110D to return the partial data, in an attempt to retrieve at least three pieces of partial data. Assume a case where the client 110A boots at the business start time at office with many of the server 100 and the clients 110B to 110D already in operation or about to start.

In FIG. 6, the server 100 and the clients 110B and 110D are in operation, and the client 110C is suspended. The client 110A receives the partial data returned from the server 100 and the client 110B, to have three pieces of partial data, thereby restoring the business OS program 20 and the user data 22 onto the storage 104 to enable the user to start working. As described above, the client 110A can start operating even when part of the partial data that transmitted to the outside is missing. Therefore, in organizations or corporations where every user performs their tasks and duties during the same time period of a day, the startup of the client 110A is assumed highly unlikely to fail. Furthermore, because the parameters can be set at any desired values in the secret sharing schemes, the parameters can accordingly be adapted to the usage environment, thereby making the startup of the client 110A even more unlikely to fail.

Furthermore, the clients 110B to 110D may have the same function as the client 110A. Thus, the clients 110A to 110D may exchange partial data between themselves. This example is shown in FIG. 7.

Figure 7:
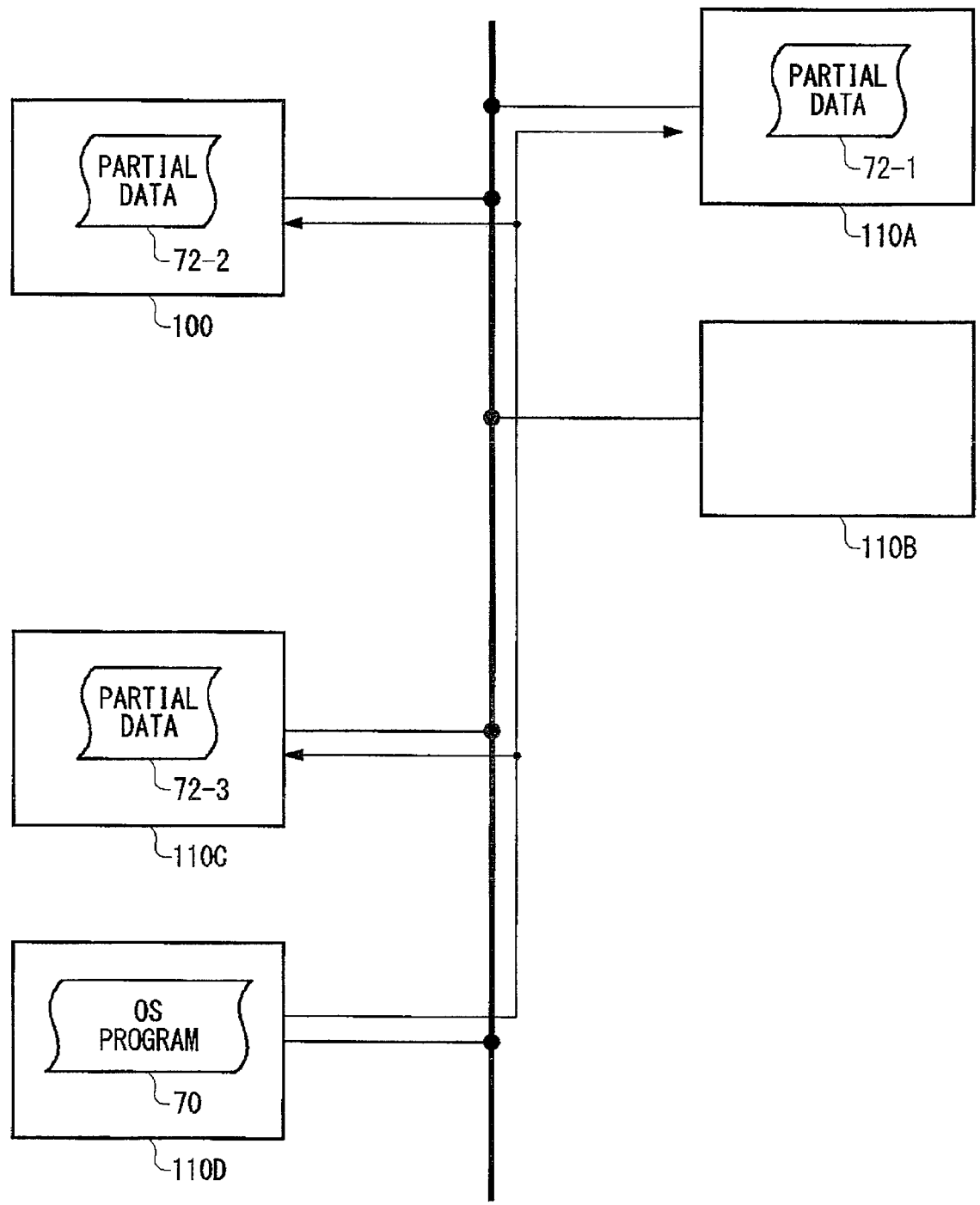
FIG. 7 illustrates the information system 10 where the client 110D divides an OS program 70 into pieces of partial data and transmits the pieces of partial data to other computers according to the present embodiment.

FIG. 7 illustrates the information system 10 where the client 110D divides an OS program 70 into pieces of partial data and transmits the pieces of partial data to other computers according to the present embodiment. The client 110D stores the OS program 70 used by a user of the client 110D to perform duties.

The client 110D divides the archive data of the OS program 70 into a plurality of pieces of partial data in accordance with the secret sharing scheme. The generated pieces of partial data are referred to as partial data 72-1 to 72-3. The client 110D transmits the generated partial data 72-1 to 72-3, in a one-to-one correspondence, to other information processing apparatuses with which the client 110D communicates via the communication network, for example, the server 100 and the clients 110A and 110C. In this manner, the present embodiment can prevent leakage of the information or the like of the OS program 70 even if the client 110D is stolen.

The following details the processes to divide and restore the archive data in accordance with the secret sharing schemes.

Figure 8:
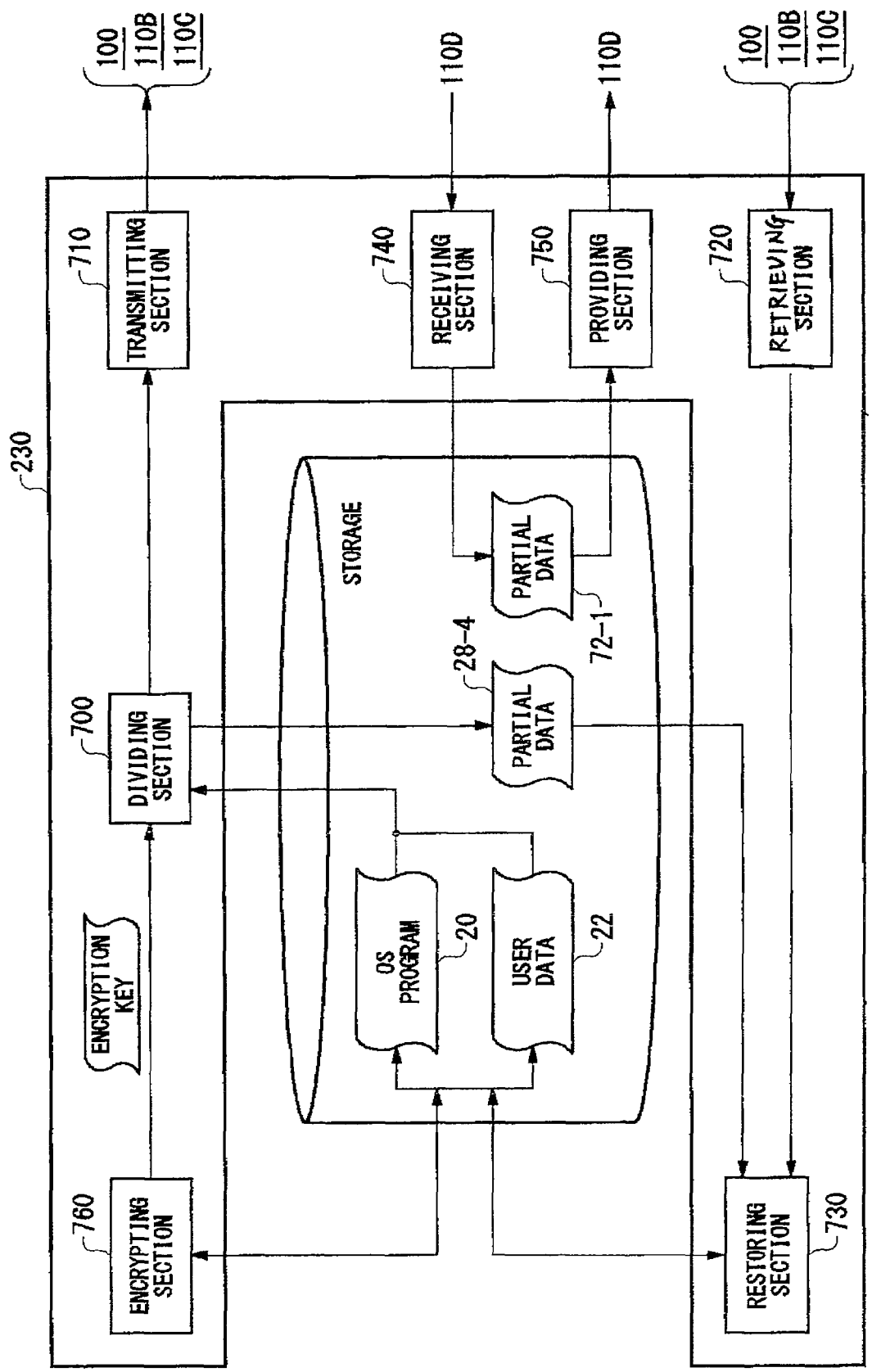
FIG. 8 illustrates an exemplary functional configuration of a data management system 230 according to the present embodiment.

FIG. 8 illustrates an exemplary functional configuration of the data management system 230 according to the present embodiment. The data management system 230 includes a dividing section 700, a transmitting section 710, a data retrieval section 720, a restoring section 730, a receiving section 740, a providing section 750, and an encrypting section 760. Each section may also be referred to as a similarly named logic and/or utility, indicating that the section is a functional component that is implemented via hardware, software, or a combination of hardware and software, such as program code/instructions associated with the data management system and which are executed by a processor of the corresponding apparatus. The dividing section 700 reads the business OS program 20 and the user data 22 from the storage 104 at the operation shutdown of the client 110A, and generates the archive data of the business OS program 20 and the user data 22.

The dividing section 700 divides the generated archive data into the predetermined first number of pieces of partial data in accordance with the secret sharing schemes. In the secret sharing schemes, the predetermined minimum number of pieces of partial data is required to restore the original archive data, and the first number is set larger than or equal to the minimum number. The generated pieces of partial data are labeled as partial data 28-1 to 28-4.

Here, the dividing section 700 may divide any data, not limited to the archive data, as long as the data is stored on the storage 104. For example, the dividing section 700 may divide data (not archive data) read from the storage 104 for use at the next bootup of the client 110A. An example of such data is an encryption key described later. This type of data is detailed later.

The first number and the minimum number may be set at any values adaptively to the user environment, as long as the first number is larger than or equal to the minimum number. The difference or ratio between the first number and the minimum number may also be set at any value, and the first number and the minimum number themselves may be automatically determined.

For example, the dividing section 700 may transmit a request to each information processing apparatus to ask whether it is capable of receiving partial data, to determine the number of other information processing apparatuses capable of receiving partial data, and to designate the values of the first number and the minimum number based on the determined number. For example, under the condition that ten information processing apparatuses can receive partial data, the dividing section 700 may set the first number at ten and the minimum number at seven, where the minimum number of seven is obtained by subtracting a predetermined value of three from the first number of ten.

The transmitting section 710 transmits one or more of the first number of pieces of partial data to one or more other information processing apparatuses, and deletes the one or more pieces of partial data from the storage 104. The number of the pieces of partial data to be transmitted and thus deleted may be preferably set larger than the difference between the first number and the minimum number so that the archive data cannot be restored with the client 110A alone.

For example, the transmitting section 710 transmits the partial data 28-1 to the server 100, the partial data 28-2 to the client 110B, and the partial data 28-3 to the client 110C, and deletes the partial data 28-1 to 28-3 from the storage 104. The dividing section 700 may store the partial data 28-4 onto the storage 104.

The retrieving section 720 restores the data on the storage 104 at the subsequent startup of the client 110A. For the data restoration, the retrieving section 720 retrieves one or more of the pieces of partial data 28 from one or more other information processing apparatuses, and stores the retrieved pieces of partial data 28 onto the storage 104. The number of pieces of partial data 28 required to be retrieved by the retrieving section 720 may be at least equal to the difference between the number of pieces of partial data 28 that have already been stored on the storage 104 and the minimum number. For example, under the condition that one piece of partial data 28 has been already stored on the storage 104 and the minimum number is three, the retrieving section 720 retrieves at least two pieces of partial data 28 from other information processing apparatuses.

The restoring section 730 restores the data onto the storage 104 using the minimum number of pieces of partial data under the condition that the number of pieces of partial data 28 stored on the storage 104 has reached the minimum number after the partial data retrieval. In this example, the restoring section 730 restores the business OS program 20 and the user data 22 on the storage 104. The business OS 210 starts operating in accordance with the business OS program 20 thus restored.

After the series of above-described processing and functions, the confidential information is divided to be stored onto a plurality of information processing apparatuses as a plurality of pieces of partial data in accordance with the secret sharing schemes. This prevents leakage of the confidential information even at the theft of one information processing apparatus. Also by not been required to store the entirety of the confidential information, the server 100 is free from concentration of the processing load and the network load.

For even lighter load on the network, the data management system 230 may divide, instead of the archive data, an encryption key to encrypt the archive data, to be stored onto other apparatuses as pieces of partial data. This is discussed as follows in detail.

While the client 110A is still operating (i.e. not at the shutdown of the client 110A), the dividing section 700 generates an encryption key to encrypt the archive data of the business OS program 20 and the user data 22 stored on the storage 104, and stores the generated encryption key on the storage 104. Preferably, the dividing section 700 updates the encryption key at regular time intervals. The regular updates can lower the risk of illegal retrieval of the encryption key. The encryption method on which the encryption key is based on is not limited to be a particular type. For example, the encryption key may be any safe key of a sufficient length (e.g. 1024 bits).

At each time of generating and updating an encryption key, the dividing section 700 divides the encryption key into the first number of pieces of partial data. The transmitting section 710 transmits the first number of pieces of partial data thus generated respectively to one or more other information processing apparatuses (e.g. the server 100 and the clients 110B and 110C). The encryption key thus transmitted has a sufficiently smaller data size than the archive data, which contributes to reduction of load on the network and the other information processing apparatuses.

At shutting down the client 110A, the encrypting section 760 archives the business OS program 20 and the user data 22 to generate the archive data, encrypts the archive data using the encryption key, stores the encrypted archive data on the storage 104 and deletes the encryption key from the storage 104. Consequently, the client 110A can not resume operation of the business OS program 20 unless retrieving the encryption key. This enables to prevent leakage of the information even at the theft of the client 110A.

In shutting down the client 110A, the encrypting section 760 does not require any other information processing apparatuses, because the transmitting section 710 has already transmitted the pieces of partial data constituting the encryption key used for the encryption to other information processing apparatuses at the time of generating and updating of the encryption key. Therefore, even when a sufficient number of partial data destinations are not present at the shutdown of the client 110A (for example, when a user works alone until late in an organization), the encrypting section 760 can still encrypt the confidential information within the client 110A to property shut down the client 110A.

In this example, the retrieving section 720 operates as described earlier, except that the partial data is associated with an encryption key and not with the archive data itself, and that the restoring section 730 performs an operation corresponding to the encryption. The restoring section 730 restores the encryption key on the storage 104 using the minimum number of pieces of partial data stored on the storage 104. The restoring section 730 then decrypts the archive data having been encrypted at the shutdown of the client 110A and stored on the storage 104, using the restored encryption key, to start operating the business OS 210 in accordance with the business OS program 20.

Figure 9:
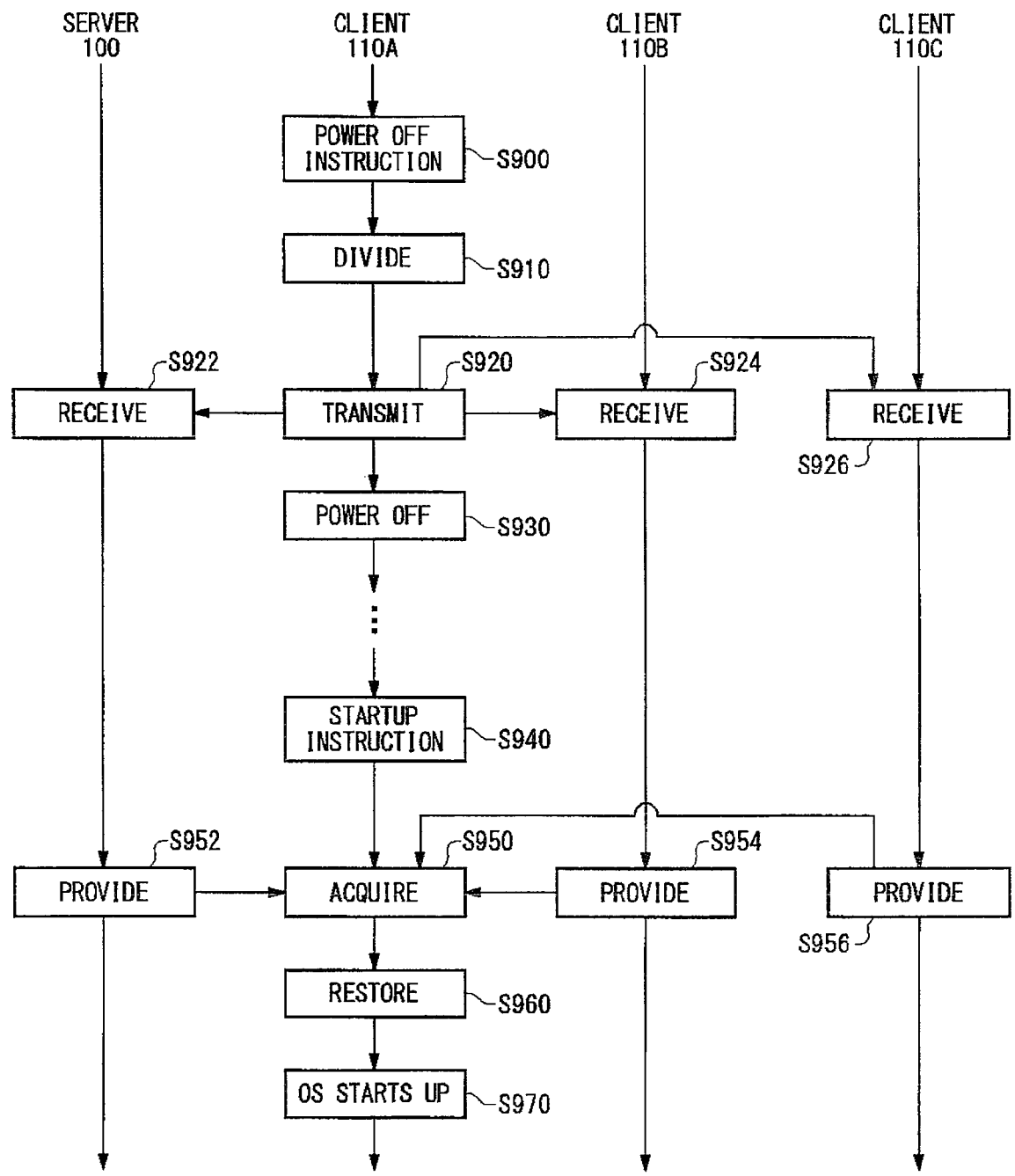
FIG. 9 illustrates a first example of a flow of processes performed by the information system 10 according to the present embodiment.

FIG. 9 illustrates a first example of the flow of the processes performed by the information system 10 according to the present embodiment. The client 110A starts the series of operations shown in FIG. 9 on reception of an instruction to shut down the client 110A, for example, a power off instruction (step S900). To begin with, the dividing section 700 divides the data stored on the storage 104 into the predetermined first number of pieces of partial data in accordance with the secret sharing schemes (step S910). According to the secret sharing schemes, the predetermined minimum number of pieces of partial data is required to restore the data, and the first number is larger than or equal to the minimum number.

In the first example shown in FIG. 9, the data to be divided is the archive data of the business OS program 20 and the user data 22. In this example, the dividing section 700 may generate the archive data of the files in the Windows and MyDocument folders in the C drive as mentioned above, and divide the generated archive data. The dividing section 700 may also generate archive data of different folders or files, for example, under the condition that a different type of operating system is used. The dividing section 700 may generate archive data of the entire file system of the storage 104.

One example of the secret sharing schemes is the threshold secret sharing scheme. In the threshold secret sharing scheme, if the number of retrieved pieces of partial data is less than the minimum number, the retrieved pieces of partial data can not restore even a single bit of the original data, or can not be even used as a clue for the restoration. Therefore the original data can be safely protected. Another example of the secret sharing schemes is the ramp secret sharing scheme. The ramp secret sharing scheme can reduce the size of each piece of partial data while the security is hardly degraded.

Furthermore, All or Nothing Transform (AONT) may be used. Please refer to the website of trusted-solutions.jp/core/aont/html (at hypertext transfer protocol—http) for details. When AONT is used in data conversion, restoration of the original data is not possible unless all the converted data is present. The AONT is utilized in the present embodiment. The dividing section 700 converts the data (for example, the archive data) stored on the storage 104 by way of AONT, and divides the converted data into the first number of pieces of partial data, for example, simply in units of predetermined bytes, where the first number is equal to the minimum number. In this way, the original data can be strictly kept confidential unless all pieces of the first number of pieces of partial data are retrieved.

Subsequently in the flow, the transmitting section 710 transmits the first number of pieces of divided partial data (step S920). In detail, the transmitting section 710 selects one or more information processing apparatuses to which partial data is to be transmitted. For example, the transmitting section 710 may select some of the other information processing apparatuses available for communication with the client 110A in a random manner. The transmitting section 710 preferably selects a different set of information processing apparatuses each time. The number of information processing apparatuses selected by the transmitting section 710 is preferably larger than the difference between the first number and the minimum number. When using SSS (4, 3) in conversion, for example, the number of information processing apparatuses selected by the transmitting section 710 is larger than the difference "1" between "4" and "3".

The transmitting section 710 preferably selects information processing apparatuses located geographically apart from each other. For example, the storage 104 pre-stores, in association with each information processing apparatus connected to the communication network, indication information indicating a range that establishes the position of the information processing apparatus. The indication information may be an IP address.

According to the configuration of the communication network, the values of a predetermined number of upper digits of the IP address may be associated with the area indicating the position of each information processing apparatus. For example, the area may indicate a country, a state, a prefecture, a city, a building or a department within a corporation. With reference to the IP address of an information processing apparatus, the transmitting section 710 can identify the range indicating the position of the information processing apparatus, The indication information may also be characters, numbers, symbols or combinations of these which directly indicate the area such as a country, a state, a prefecture, a city, a building or a department within a corporation.

In this case, when a plurality of other information processing apparatuses communicate with the clients 110A, the transmitting section 710 determines the position of each information processing apparatus, based on the above-described indication information. The transmitting section 710 then selects some of the other information processing apparatuses placed at different positions from each other, as the partial data destinations. In FIG. 9, the transmitting section 710 selects three information processing apparatuses, i.e. the server 100 and the clients 110B and 110C.

The transmitting section 710 transmits, for example, three pieces of partial data to the server 100 and the clients 110B and 110C in a one-to-one correspondence, and deletes the pieces of partial data from the storage 104. Here, the number of pieces of partial data to be transmitted (i.e. three) is larger than the value obtained by subtracting the minimum number from the first number. The transmitting section 710 preferably transmits a different piece of partial data to each of the destination information processing apparatuses, such that the receiving section 740 of the server 100 receives the partial data 28-1 (step S922), the receiving section 740 of the client 110B receives the partial data 28-2 (step S924), and the receiving section 740 of the client 110C receives the partial data 28-3 (step S926), for example.

Subsequently in the flow, the client 110A is powered off (step S930). In the above-described manner, the confidential information can be protected even when the powered-off client 110A is stolen, because the client 110A does not store a sufficient amount of partial data to restore the original data.

The client 110A starts operating in response to an instruction to start up the client 110A (step S940). To be specific, the client 110A may read, from the ROM 1010, the BIOS program and the program for the data management system 230, and cause the CPU 1000 to execute the read programs. After this, the retrieving section 720 of the data management system 230 attempts to retrieve necessary partial data by transmitting a partial data return request to one or more other information processing apparatuses (step S950).

To be specific, the retrieving section 720 may broadcast the partial data return request to the one or more other information processing apparatuses. This configuration is specifically realized in the following manner, for example. When transmitting the pieces of partial data in the preceding step S920, the transmitting section 710 also transmits information identifying the client 110A, to which the transmitted pieces of partial data are to be returned, in association with the pieces of partial data. The other information processing apparatuses receive the identifying information and store the received identifying information. In this way, the other information processing apparatuses can appropriately return the pieces of partial data in response to the return request.

The retrieving section 720 broadcasts the information identifying the client 110A in association with the return request. Under the condition that each of the other information processing apparatuses receives the return request, the providing section 750 of the information processing apparatus reads partial data associated with the identifying information received in association with the return request from the storage in the information processing apparatus, and returns the read partial data (steps S952, S954 and S956). The identifying information may be a MAC (Media Access Controller) address of the client 110A, but not limited to the same.

The retrieving section 720 may also transmit the partial data return request exclusively to the information processing apparatuses to which the pieces of partial data have been transmitted, which are among the one or more other information processing apparatuses. This configuration is specifically realized in the following manner, for example. In the preceding step S920, the transmitting section 710 transmits the pieces of partial data respectively to the other information processing apparatuses, and stores onto the storage 104 information identifying each of the other information processing apparatuses to which the pieces of partial data are transmitted. In this manner, the retrieving section 720 can appropriately determine the information processing apparatuses to which the pieces of partial data have been transmitted. The identifying information may be stored on a removable medium such as a USB memory, in place of the storage 104.

The retrieving section 720 reads the identifying information from the storage 104, and transmits the return request to the information processing apparatuses identified by the read identifying information. (Alternatively, a computer to which the above-mentioned removable medium is attached reads the identifying information from the removable medium, and transmits the return request to the information processing apparatuses identified by the read identifying information.)

With the above configuration, the return request is transmitted exclusively to the information processing apparatuses to which the pieces of partial data have been transmitted. Therefore, the network traffic can be reduced when compared with the case where the return request is broadcast. In this case, under the condition that each of the other information processing apparatuses receives the return request, the providing section 750 of the information processing apparatus simply returns the requested partial data. This simple return process is sufficient to enable the client 110A to appropriately restore the original data.

As a further different example, a server such as the server 100 may centralize the management of the transmission of the pieces of partial data between apparatuses. An exemplary method to realize this configuration is described with reference to FIG. 10.

FIG. 10 illustrates, as an example, a variety of information stored on the server 100 according to the present embodiment. When transmitting the pieces of partial data in the step S920, the transmitting section 710 records, onto the server 100, the information identifying the user who is logged in the client 110A (for example, the log-in ID) in association with the pieces of information respectively identifying the users who are logged in the server 100 and the clients 110B and 110C, to which the pieces of partial data are to be transmitted. The recorded information is referred to as destination management information. An example of the destination management information is shown on the upper side in FIG. 10.

In the destination management information, the server 100 stores a user AAA in association with users CCC, BBB and ADMIN. The destination management information in FIG. 10 indicates that the pieces of partial data are transmitted from the information processing apparatus in which the user AAA is logged to the information processing apparatuses in which the users CCC, BBB and ADMIN are respectively logged.

The server 100 stores log-in management information as illustrated on the lower side in FIG. 10. In the log-in management information, the server 100 records the information identifying each information processing apparatus (machine identifying information, for example, an IP address) in association with the information identifying the user who is logged in the information processing apparatus. The log-in management information is generated in such a manner that each client 110 records the log-in name of a user who is logged in the client 110 in association with the IP address of the client 110 at the time of the user's log-in.

With reference to the above-described information, the retrieving section 720 transmits the return request. To be specific, the retrieving section 720 first obtains the information identifying the user who is logged in the client 110A. The retrieving section 720 then transmits the obtained identifying information to the server 100. The server 100 uses the received identifying information as source user identifying information and retrieve, from the destination management information, destination user identifying information associated with the received source user identifying information. For example, when the user AAA is logged in the client 110A, the server 100 retrieves the users BBB, CCC and ADMIN which are associated with the user AAA.

The server 100 then retrieves, from the log-in management information, machine identifying information associated with the retrieved destination user identifying information. For example, the server 100 retrieves three pieces of identifying information "192. 168. 0. X", "192. 168. 0. Y" and "192. 168. 0. Z". The server 100 returns the retrieved identifying information to the client 110A. In response, the retrieving section 720 transmits the partial data return request to the information processing apparatuses identified by the returned identifying information.

Referring back to FIG. 9, the restoring section 730 restores the data on the storage 104 based on the minimum number of pieces of partial data on condition that the number of pieces of partial data 28 stored on the storage 104 reaches the minimum number through the partial data retrieval (step S960). In this example, the restoring section 730 restores the business OS program 20 and the user data 22, on the storage 104. The retrieving section 720 may make an inquiry to the server 100 as to whether the restored business OS program 20 is the latest version. When the restored business OS program 20 is not the latest version, the retrieving section 720 retrieves from the server 100 data to update the restored business OS program 20 to the latest version.

The update data may correspond to the difference between the old and latest versions in terms of programs, archive data, or file systems. The retrieving section 720 updates the restored business OS program 20 with the use of the retrieved update data. As mentioned here, the business OS program 20 may be managed by a combination of the method based on the secret sharing schemes and the method in which the update data is retrieved from the server 100.

Subsequently in the flow, the retrieving section 720 causes the business OS 210 to start operating in accordance with the business OS program 20 (step S970). To shut down again, the client 110A goes back to the operation in the step S900 and repeats the series of operations in FIG. 9. It should be noted here that the clients 110B, 110C and 110D operate in the same manner as the client 110A. Therefore, the clients 110B to 110D are not explained herein.

Figure 11:
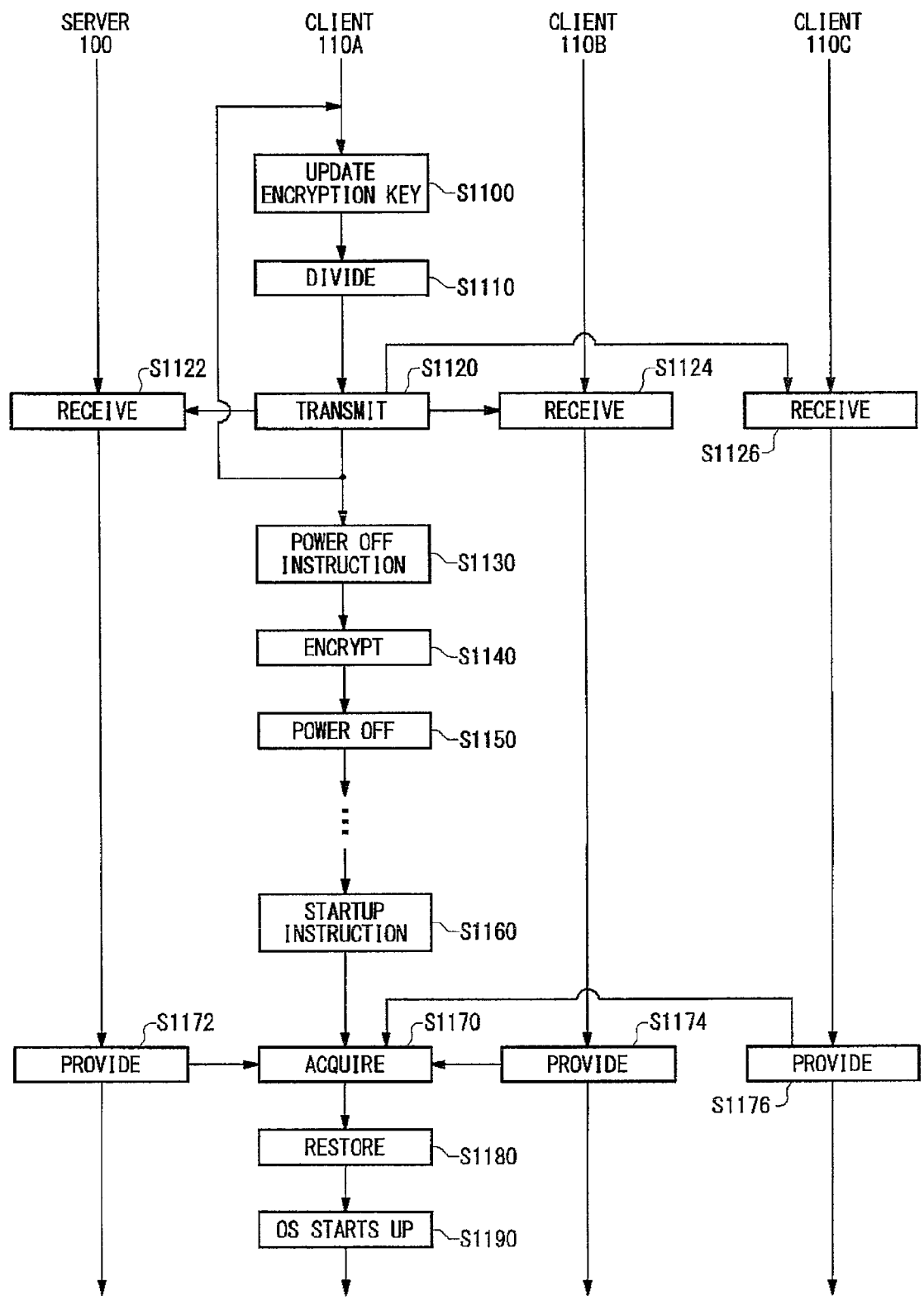
FIG. 11 illustrates a second example of a flow of processes performed by the information system 10 according to the present embodiment.

FIG. 11 illustrates a second example of the flow of the processes performed by the information system 10 according to the present embodiment. In this example, the client 110A divides the encryption key to encrypt the archive data, in place of the archive data itself, in accordance with the secret sharing schemes into pieces of partial data, and transmits the pieces of partial data. Specifically, the dividing section 700 of the client 110A generates the encryption key to encrypt the archive data, or updates the generated encryption key (step S1100).

Following this, the dividing section 700 divides the generated or updated encryption key into the first number of pieces of partial data (step S1110). The transmitting section 710 then transmits one or more of the first number of pieces of divided partial data to one or more other information processing apparatuses, and deletes the one or more pieces of partial data from the storage 104 (step S1120). Here, the transmitting section 710 transmits three pieces of partial data respectively to the server 100 and the clients 110B and 110C, for example.

In response, the receiving sections 740 of the server 100 and the clients 110B and 110C respectively receive the pieces of partial data and store the received pieces of partial data (steps S1122, S1124 and S1126).

Note that the client 110A repeats the above series of operations until receiving the power off instruction, for example, at regular time intervals.

When the client 110A receives the instruction to shut down, for example, the power off instruction (step S1130), the encrypting section 760 of the client 111A generates the archive data of the business OS program 20 and the user data 22 stored on the storage 104, and encrypts the generated archive data with the use of the latest (i.e. most recently updated) encryption key (step S1140). The encrypted archive data is stored on the storage 104. On completion of the encryption, the client 110A deletes the used encryption key from the storage 104, and then shuts down (step S1150).

After this, the client 110A may receive the instruction to start up the client 110A (step S1160). In response to the instruction, the retrieving section 720 of the client 110A retrieves the pieces of partial data from the server 100 and the clients 110B and 110C, and stores the retrieved pieces of partial data onto the storage 104 (step S1170). Which is to say, the server 100 and the clients 110B and 110C provide the pieces of partial data which are transmitted thereto from the client 110A in the step S1120, in response to the request made by the client 110A (steps S1172, S1174 and S1176).

The restoring section 730 restores the data on the storage 104 by using the minimum number of pieces of partial data on condition that the number of pieces of partial data 28 stored on the storage 104 reaches the minimum number through the partial data retrieval (step S1180). To be specific, the restoring section 730 restores the encryption key on the storage 104. The restoring section 730 then decrypts the encrypted archive data with the use of the restored encryption key, and expands the decrypted archive data to restore the business OS program 20 and the user data 22. As a result, the business OS 210 starts operating in accordance with the business OS program 20 (step S1190).

As discussed above, the restoring section 730 may retrieve from the server 100 updates to a given program such as an OS, update the given program with the retrieved data and then execute the given program. In this manner, such data as OSs can be prevented from being left not-updated on the client 110A. Also, the user of the client 110A can always use the latest OS as if the user uses a thin client of the update type.

In the second example described with reference to FIG. 11, the client 110A transmits the encryption key to encrypt the archive data, in place of the archive data itself. Therefore, the load on the network can be further lightened. Here, the client 110A updates the encryption key at regular time intervals. Therefore, the second example can reduce the risk of illegal decryption of the encrypted data. The client 110A can transmit the encryption key at timings determined irrespective of the timing of switching off the client 110A, for example, at regular time intervals. Therefore, the client 110A can appropriately protect the confidential data even in a case where the number of information processing apparatuses that are in operation at the power-off of the client 110A is not sufficiently large.

Figure 12:
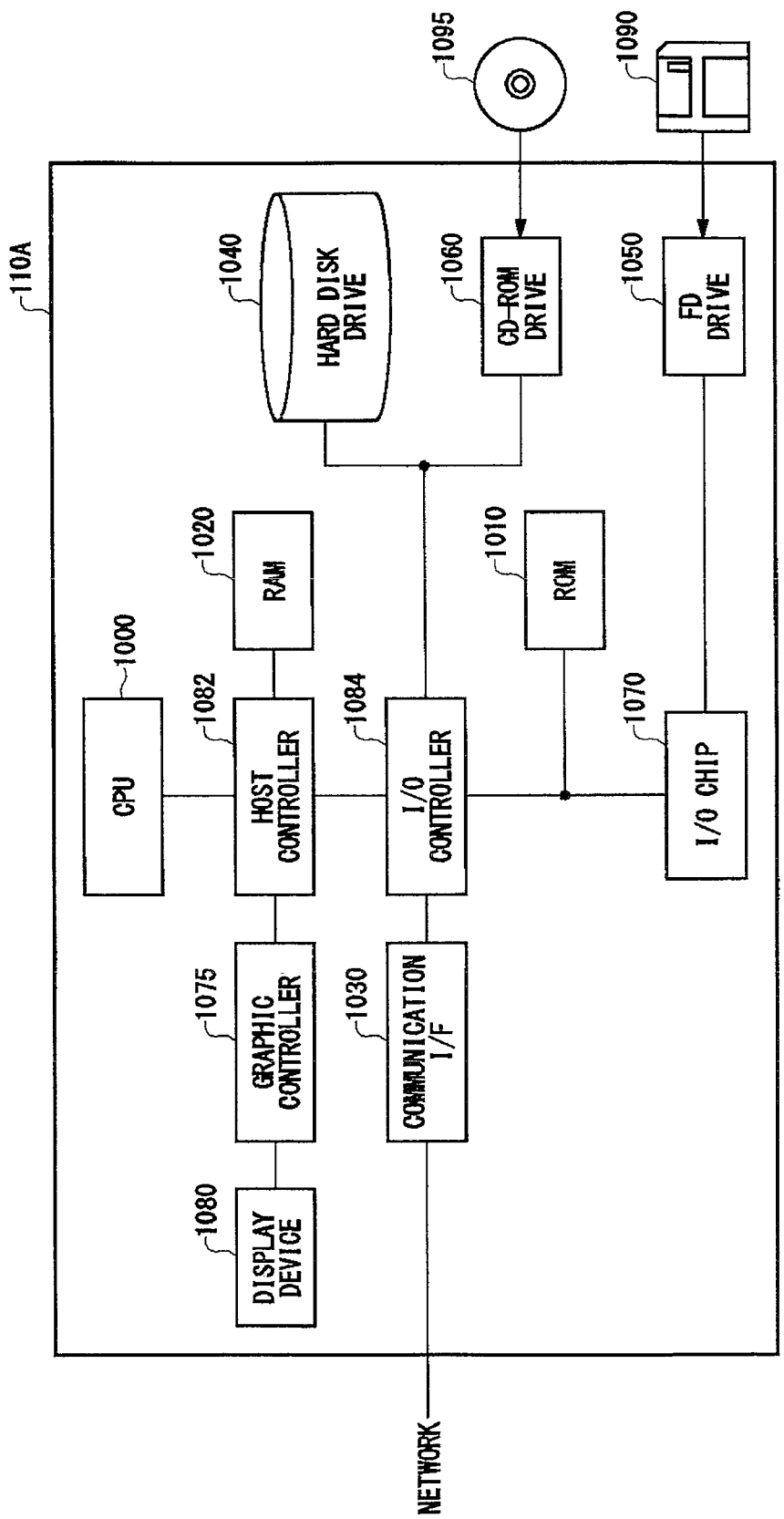
FIG. 12 illustrates an exemplary hardware configuration of the client 110A according to the present embodiment.

FIG. 12 illustrates an exemplary hardware configuration of the client 110A according to the present embodiment. The client 110A is constituted by a CPU peripheral section, an input/output (I/O) section and a legacy I/O section. The CPU peripheral section includes a CPU 1000, a RAM 1020 and a graphic controller 1075 which are connected to each other by means of a host controller 1082. The I/O section includes a communication interface 1030, a hard disk drive 1040, and a CD-ROM drive 1060 which are connected to the host controller 1082 by means of an I/O controller 1084. The legacy I/O section includes a ROM 1010, a flexible disk drive 1050, and an I/O chip 1070 which are connected to the I/O controller 1084.

The host controller 1082 connects the RAM 1020 with the CPU 1000 and graphic controller 1075 which access the RAM 1020 at a high transfer rate. The CPU 1000 operates in accordance with programs stored on the ROM 1010 and RAM 1020, to control the constituents. The graphic controller 1075 obtains image data which is generated by the CPU 1000 or the like on a frame buffer provided within the RAM 1020, and causes a display device 1080 to display the obtained image data. The graphic controller 1075 may also include a frame buffer for storing the image data generated by the CPU 1000 or the like.

The I/O controller 1084 connects, to the host controller 1082, the hard disk drive 1040, communication interface 1030 and CD-ROM drive 1060, which are I/O devices operating at a relatively high rate. The communication interface 1030 communicates with external apparatuses via the network. The hard disk drive 1040 is shown as an example of the above-described storage 104, and stores programs and data to be used by the client 110A. The CD-ROM drive 1060 reads programs or data from a CD-ROM 1095, and supplies the read programs or data to the RAM 1020 or hard disk drive 1040.

The I/O controller 1084 is also connected to the ROM 1010, flexible disk drive 1050 and I/O chip 1070, which are I/O devices operating at a relatively low rate. The ROM 1010 stores a boot program executed by the CPU 1000 at the booting of the client 110A, programs dependent on the hardware of the client 110A, and the like. The flexible disk drive 1050 reads programs or data from a flexible disk 1090, and supplies the read programs or data to the hard disk drive 1040 or RAM 1020 via the I/O chip 1070. The I/O chip 1070 is connected to the flexible disk drive 1050, and is used to connect a variety of I/O devices, via a parallel port, a serial port, a keyboard port, a mouse port or the like, to the client 110A.

The programs to be provided to the client 110A are provided by a user in the state of being stored on a recording medium such as the flexible disk 1090, the CD-ROM 1095, and an IC card. The programs are read from the recording medium via the I/O chip 1070 and/or I/O controller 1084, and the read programs are installed in the client 110A to be executed. The programs cause the client 110A or the like to perform an operation same as the operation performed by the client 110A described with reference to FIGS. 1 to 11. Therefore, such an operation is not described herein.

The programs mentioned above may be stored on an external recording medium. Such a recording medium is, for example, an optical recording medium such as DVD and PD, a magnet-optical recording medium such as MD, a tape medium, a semiconductor memory such as an IC card and the like, in addition to the flexible disk 1090 and CD-ROM 1095. The recording medium may also be a storage, such as a hard disk or RAM, which is provided in a server system connected to a dedicated communication network or the Internet, and the programs may be provided to the client 110A via the network.

According to the exemplary embodiment described with reference to FIGS. 1 to 12, the data that is stored on a client is divided into pieces of partial data in accordance with the secret sharing schemes, and the pieces of partial data are separately held on different apparatuses. In this manner, the exemplary embodiment can realize such a configuration that the confidential information is not kept on the client. As a result, the exemplary embodiment can configure normal clients such as personal computers so as to operate similarly to thin clients, without requiring the enhancement of the communication network or server.

The verification done by the inventors of the present application has proved that, when the system according to the present embodiment is combined with conventional communication network and server without enhancement, sufficiently practical effects are produced, as specifically explained in the following. When a conventional thin client adopting the image transmission method is combined with conventional communication network and server without enhancement, several dozen minutes are required to start up a single client. Therefore, this combination is not practical. When a conventional thin client adopting the screen transmission method is combined with conventional communication network and server without enhancement, a significant drop frame occurs in the screen display, and so this combination is not practical either. According to the present embodiment, on the other hand, only a few minutes are required to complete the booting of a single client. Thus, the present embodiment has been proved sufficiently practical.

In view of the above, the present embodiment can increase the security of client apparatuses without requiring enormous investment, from the viewpoint of corporate managers or system administrators. For example, systems in which a large number of client apparatuses operate (for example, at call centers) are used in the bank, insurance, securities and other industries for which the security is of great importance. When utilized in such systems, the present embodiment can prevent information leakage from occurring even when any of the client apparatuses are stolen or discarded (e.g., as a result of replacement of broken or aging client apparatuses).

From the viewpoint of the users of the clients, the introduction of the system according to the present embodiment does not hamper the convenience of the personal computers in performing the duties and tasks. Consider the application program development process, for example. While normal personal computers are required to operate the application programs under development and development tools, a great deal of confidential information is stored on the personal computers such as the programs under development or test ideas. In this case, the system according to the present embodiment enables the application programs of the normal personal computers to operate as usual while enhancing the security.

Although some aspects of the present invention have been described by way of the exemplary embodiment, it should be understood that those skilled in the art might make many changes and substitutions without departing from the spirit and the scope of the present invention which is defined only by the appended claims.

The invention claimed is:

1. An information processing apparatus communicating with one or more information processing apparatuses, comprising:

a storage having thereon a business operating system and associated business user data and a personal operating system and associated personal user data;

a processor having processor executable logic that:

transmits a request signal to each of the one or more information processing apparatuses that inquires if each of the one or more information processing apparatuses are capable of receiving one or more pieces of partial data from the information processing apparatus, wherein the information processing apparatus and the one or more information processing apparatuses are geographically apart and are interconnected and communicate via a communication network;

determines, based on a received response to the inquiry from each of the one or more information processing apparatuses, a number of the one or more information processing apparatuses that is capable of receiving one or more pieces of partial data from the information processing apparatus; and in response receiving an instruction to shut down the information processing apparatus:

archives the business operating system data and associated business user data to an archive data;

divides the archive data stored on the storage of the information processing apparatus to a first number of pieces of partial data in accordance with a secret sharing scheme, wherein the secret sharing scheme requires a minimum number of pieces of partial data to restore the archive data, wherein the first number of pieces of partial data is equal to or larger than the minimum number of pieces, and wherein the information processing apparatus sets the first number and the minimum number based on the determined number of information processing apparatuses that are capable of receiving the one or more pieces of partial data;

transmits one or more pieces of partial data from the first number of pieces of partial data to at least one of the one or more information processing apparatuses;

deletes, from the storage, the one or more pieces of partial data that were transmitted;

wherein the business operating system and the personal operating system are both concurrently installed and operational when the business operating system is present on the storage, and only the personal operating system is physically installed on the storage and operational when the business operating system is not functional;

wherein the business operating system of the information processing apparatus is not physically present and cannot be accessed or used in a state where the one or more pieces of partial data are removed from the storage; and wherein the personal operating system of the information processing apparatus can be used in the state where the one or more pieces of partial data are removed from the storage.

2. The information processing apparatus of claim 1, wherein the processor, in response to a subsequent operation to restore the business operating system on the information processing apparatus:

broadcasts a partial data return request to the at least one of the one or more information processing apparatuses;

retrieves the one or more pieces of partial data from the at least one of the one or more information processing apparatuses, wherein the one or more pieces of partial data are retrieved in response to broadcasting the partial data return request;

stores the retrieved one or more pieces of partial data to the storage; and in response to the retrieved one or more pieces of partial data stored on the storage reaching the minimum number, restores the business operating system and associated business user data from the retrieved one or more pieces of partial data and initiates operation of the business operating system;

wherein the transmitted one or more pieces of partial data is larger than a difference between the first number of pieces of partial data and the minimum number; and wherein the retrieved one or more pieces of partial data is at least equal to a difference between the number of pieces of partial data that have already been stored on the storage and the minimum number.

3. The information processing apparatus of claim 2, wherein:

the one or more pieces of partial data includes data required for a next booting of the information processing apparatus; and the processor logic that divides the archive data stored on the storage to a first number of pieces of partial data further comprises logic that reads a data required for the next booting into the first number of pieces of partial data.

4. The information processing apparatus of claim 2, the logic further comprising logic that:

creates an encryption key;

divides the encryption key into the first number of pieces of partial data;

encrypts the archive data to an encrypted archive data using an encryption key;

in response to the information processing apparatus shutting down, stores the encrypted archive data to the storage; and in response to a next booting of the information processing apparatus:

retrieves the one or more pieces of partial data from the at least one of the one or more information processing apparatuses;

restores the encryption key to the storage using the retrieved one or more of pieces of partial data; and decrypts the encrypted archive data using the restored encryption key.

5. The information processing apparatus of claim 2, wherein the logic further comprises logic that:

stores, to the storage, identifying information associated with each of the one or more information processing apparatuses that identifies which of the one or more pieces of partial data were transmitted;

reads the identifying information from the storage; and transmits a partial data return request exclusively to a first subset of the information processing apparatuses, wherein the first subset of information processing apparatuses are information processing apparatuses to which the one or more pieces of partial data were transmitted;

wherein the one or more pieces of partial data retrieved from the at least one of the one or more information processing apparatuses are provided to the information processing apparatus by the at least one of the one or more information processing apparatuses responsive to the at least one of the one or more information processing apparatuses receiving the partial data return request.

6. The information processing apparatus of claim 5, wherein the identifying information is a Media Access Control (MAC) address.

7. The information processing apparatus of claim 2, the logic further comprising logic that:
- receives a piece of partial data transmitted from a second information processing apparatus of the one or more information processing apparatuses, wherein the piece of partial data is one of the first number of partial data pieces generated by the second information processing apparatus;
- stores the received partial data piece to the storage; and
- in response to receiving a second partial data return request from the second information processing apparatus:
- reads the piece of partial data from the storage; and
- returns the piece of partial data to the second information processing apparatus via the communication network.

8. The information processing apparatus of claim 2, wherein the at least one of the one or more information processing apparatuses is randomly selected.

9. The information processing apparatus of claim 1, wherein the storage contains pre-stored indication information that indicates a position of the information processing apparatus and the one or more processing apparatuses, the logic further comprising logic that:
- in response to determining that two or more information processing apparatuses are capable of receiving the one or more pieces of partial data:
- determines, based on the indication information, positions at which the two or more information processing apparatuses are placed;
- selects at least one of the two or more information processing apparatuses, wherein each of the selected at least one of the two or more information processing apparatuses is placed at a different position, and
- transmits at least one of the one or more pieces of partial data pieces to the selected information processing apparatuses.

10. The information processing apparatus of claim 1, wherein each of the one or more information processing apparatuses is managed by a different user from the information processing apparatus.

11. A method of processing data stored on a storage of an information processing apparatus communicating with one or more information processing apparatuses, the method comprising:
- the information processing apparatus transmitting a request signal to each of the one or more information processing apparatuses that inquires if each of the one or more information processing apparatuses are capable of receiving one or more pieces of partial data, wherein the information processing apparatus and the one or more information processing apparatuses are geographically apart and are interconnected and communicate via a communication network, and wherein the storage has thereon a business operating system and associated business user data and a personal operating system and associated personal user data;
- information processing apparatus determining, based on a received response to the inquiry from each of the one or more information processing apparatuses, a number of the one or more information processing apparatuses that is capable of receiving one or more pieces of partial data from the information processing apparatus;
- in response receiving an instruction to shut down, the information processing apparatus:
- archiving the business operating system data and associated business user data to an archive data;
- dividing the archive data stored on the storage to a first number of pieces of partial data in accordance with a secret sharing scheme, wherein the secret sharing scheme requires a minimum number of pieces of partial data to restore the data, wherein the first number of pieces of partial data is equal to or larger than the minimum number of pieces, and wherein the information processing apparatus sets the first number and the minimum number based on the determined number of information processing apparatuses that are capable of receiving the one or more pieces of partial data;
- transmitting one or more pieces of partial data from the first number of pieces of partial data to at least one of the one or more information processing apparatuses;
- deleting, from the storage, the one or more pieces of partial data that were transmitted;
- the information processing apparatus retrieving the one or more pieces of partial data from the at least one of the one or more information processing apparatuses;
- storing the retrieved one or more pieces of partial data to the storage; and
- in response to the retrieved one or more pieces of partial data stored on the storage reaching the minimum number, the information processing apparatus restoring the archive data from the retrieved one or more pieces of partial data
- *wherein the business operating system and the personal operating system are both concurrently installed and operational when the business operating system is present on the storage, and only the personal operating system is physically installed on the storage and operational when the business operating system is not functional;
- wherein the business operating system of the information processing apparatus is not physically present and cannot be accessed or used in a state where the one or more pieces of partial data are removed from the storage; and
- wherein the personal operating system of the information processing apparatus can be used in the state where the one or more pieces of partial data are removed from the storage; and
- in response to a subsequent operation to restore the business operating system on the information processing apparatus:
- broadcasting a partial data return request to the at least one of the one or more information processing apparatuses;
- retrieving the one or more pieces of partial data from the at least one of the one or more information processing apparatuses, wherein the one or more pieces of partial data are retrieved in response to broadcasting the partial data return request;
- storing the retrieved one or more pieces of partial data to the storage; and
- in response to the retrieved one or more pieces of partial data stored on the storage reaching the minimum number, restoring the archive data from the retrieved one or more pieces of partial data and initiating operation of the business operating system.

12. The method of claim 11, further comprising:
- the information processing apparatus storing, to the storage, identifying information associated with each of the one or more information processing apparatuses that identifies which of the one or more pieces of partial data were transmitted;
- the information processing apparatus reading the identifying information from the storage; and
- the information processing apparatus transmitting a partial data return request exclusively to a first subset of the information processing apparatuses, wherein the first subset of information processing apparatuses are information processing apparatuses to which the one or more pieces of partial data were transmitted;

wherein the one or more pieces of partial data retrieved from the at least one of the one or more information processing apparatuses are provided to the information processing apparatus by the at least one of the one or more information processing apparatuses responsive to the at least one of the one or more information processing apparatuses receiving the partial data return request.

13. The computer program product of claim 12, wherein the identifying information is a Media Access Control (MAC) address.

14. The method of claim 11, further comprising:
the information processing apparatus receiving a piece of partial data transmitted from a second information processing apparatus of the one or more information processing apparatuses, wherein the piece of partial data is one of the first number of partial data pieces generated by the second information processing apparatus;
the information processing apparatus storing the received partial data piece to the storage; and
in response to receiving a second partial data return request from the second information processing apparatus, the information processing apparatus:
reading the piece of partial data from the storage; and
returning the piece of partial data to the second information processing apparatus via the communication network.

15. A computer program product having computer instructions recorded on a computer readable recording device that when executed, enables an information processing apparatus, which communicates with one or more information processing apparatuses, to process data stored on a storage of the information processing apparatus and perform operations comprising:
transmitting, from the information processing apparatus, a request signal to each of the one or more information processing apparatuses that inquires if each of the one or more information processing apparatuses are capable of receiving one or more pieces of partial data, wherein the information processing apparatus and the one or more information processing apparatuses are geographically apart and are interconnected and communicate via a communication network, and wherein the storage has thereon a business operating system and associated business user data and a personal operating system and associated personal user data;
determining, based on based on a received response to the inquiry from each of the one or more information processing apparatuses, a number of the one or more information processing apparatuses that is capable of receiving one or more pieces of partial data from the information processing apparatus;
in response receiving an instruction to shut down the information processing apparatus:
archiving the business operating system data and associated business user data to an archive data;
dividing the archive data stored on the storage of the information processing apparatus to a first number of pieces of partial data in accordance with a secret sharing scheme, wherein the secret sharing scheme requires a minimum number of pieces of partial data to restore the data, wherein the first number of pieces of partial data is equal to or larger than the minimum number of pieces, and wherein the information processing apparatus sets the first number and the minimum number based on the determined number of information processing apparatuses that are capable of receiving the one or more pieces of partial data;
transmitting one or more pieces of partial data from the first number to at least one of the one or more information processing apparatuses;
deleting, from the storage, the one or more pieces of partial data that were transmitted;
wherein the business operating system and the personal operating system are both concurrently installed and operational when the business operating system is present on the storage, and only the personal operating system is physically installed on the storage and operational when the business operating system is not functional;
wherein the business operating system of the information processing apparatus is not physically present and cannot be accessed or used in a state where the one or more pieces of partial data are removed from the storage; and
in response to a subsequent operation to restore the business operating system on the information processing apparatus:
broadcasting a partial data return request to the at least one of the one or more information processing apparatuses;
retrieving the one or more pieces of partial data from the at least one of the one or more information processing apparatuses, wherein the one or more pieces of partial data are retrieved in response to broadcasting the partial data return request;
storing the retrieved one or more pieces of partial data to the storage; and
in response to the retrieved one or more pieces of partial data stored on the storage reaching the minimum number, restoring the archive data from the retrieved one or more pieces of partial data and initiating operation of the business operating system.

16. The computer program product of claim 15, the computer instructions further comprising instructions that when executed, enables the information processing apparatus to perform the operations of:
storing, to the storage, identifying information associated with each of the one or more information processing apparatuses that identifies which of the one or more pieces of partial data were transmitted;
reading the identifying information from the storage; and
transmitting a partial data return request exclusively to a first subset of the information processing apparatuses, wherein the first subset of information processing apparatuses are information processing apparatuses to which the one or more pieces of partial data were transmitted;
wherein the one or more pieces of partial data retrieved from the at least one of the one or more information processing apparatuses are provided to the information processing apparatus by the at least one of the one or more information processing apparatuses responsive to the at least one of the one or more information processing apparatuses receiving the partial data return request.

17. The computer program product of claim 16, wherein the identifying information is a Media Access Control (MAC) address.

18. The computer program product of claim 15, the computer instructions further comprising instructions that when executed, enables the information processing apparatus to perform the operations of:
receiving a piece of partial data transmitted from a second information processing apparatus of the one or more information processing apparatuses, wherein the piece of partial data is one of the first number of partial data pieces generated by the second information processing apparatus;

storing the received partial data piece to the storage; and in response to receiving a second partial data return request from the second information processing apparatus:

reading the piece of partial data from the storage; and returning the piece of partial data to the second information processing apparatus via the communication network.

* * * * *